United States Patent [19]

Ansite et al.

[11] 4,419,110

[45] Dec. 6, 1983

[54] GAS FILTER CONTAINER

[75] Inventors: William K. Ansite, Glendale; J. A. Van Haastert, Temple City; James D. Cleary, Monrovia, all of Calif.

[73] Assignee: Figgie International Inc., Willoughby, Ohio

[21] Appl. No.: 294,486

[22] Filed: Aug. 20, 1981

[51] Int. Cl.³ .................... B01D 46/00; B01D 27/08
[52] U.S. Cl. .................... 55/356; 55/385 R; 55/503; 55/DIG. 33; 55/DIG. 35; 128/201.25; 128/202.27; 128/205.27; 244/151 A
[58] Field of Search .................... 55/356, 385 R, 503, 55/505, DIG. 33, DIG. 35; 128/201.25, 202.27, 205.27; 244/151 R, 151 A

[56] References Cited

U.S. PATENT DOCUMENTS

| 2,104,016 | 1/1938 | Biggs | 55/DIG. 35 X |
| 2,577,606 | 12/1951 | Conley | 55/503 |
| 2,642,061 | 6/1953 | Boyer | 55/503 X |
| 3,202,150 | 8/1965 | Miller | 55/DIG. 35 X |
| 3,496,703 | 2/1970 | MacLeod et al. | 55/356 X |
| 4,088,461 | 5/1978 | Brauer | 55/DIG. 35 X |

FOREIGN PATENT DOCUMENTS 379381 9/1932 United Kingdom ......... 55/DIG. 33

Primary Examiner—Kathleen J. Prunner
Attorney, Agent, or Firm—Christel, Bean & Linihan

[57] ABSTRACT

A gas filter container for housing a filter capable of filtering gases containing toxic components. The container includes a flexible end wall adapted to be positioned against the body of the user and is secured by means of a series of straps, two of which are adapted to be attached to a harness structure, such as a parachute harness, worn by the user, in a readily separable fashion so that disconnection of the harness will simultaneously free the two straps connected to the gas filter container. The flexible end wall includes inwardly-directed projections to space the wall from the filter inlet when the wall is deflected and thereby maintain a communication path to the filter inlet.

9 Claims, 7 Drawing Figures

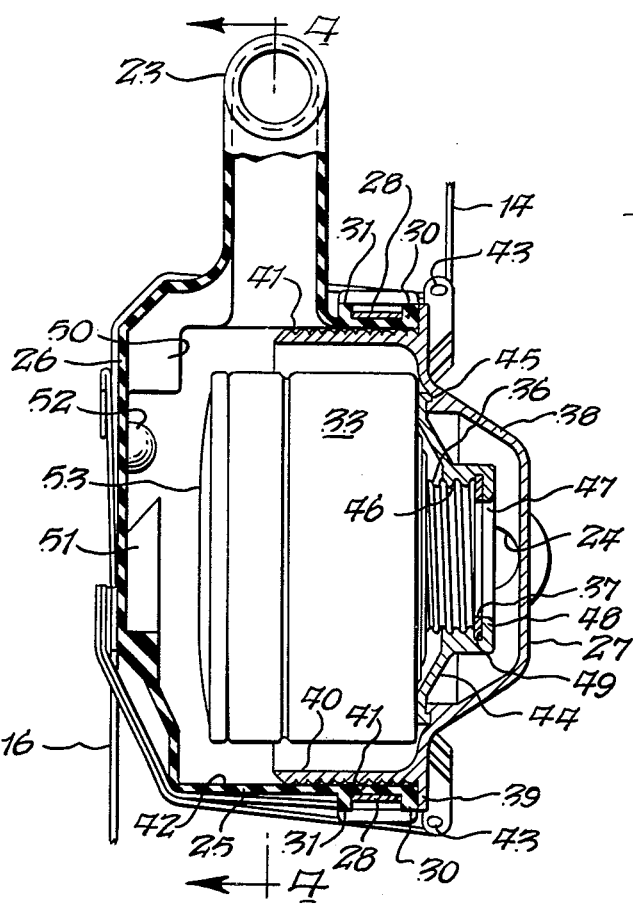
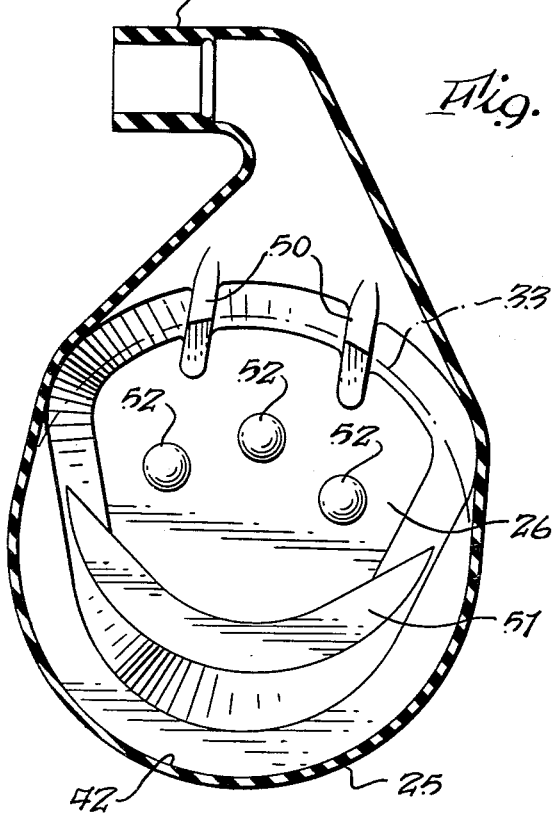
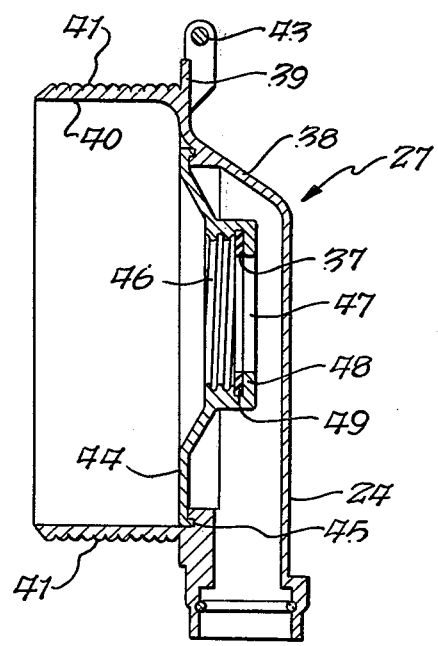

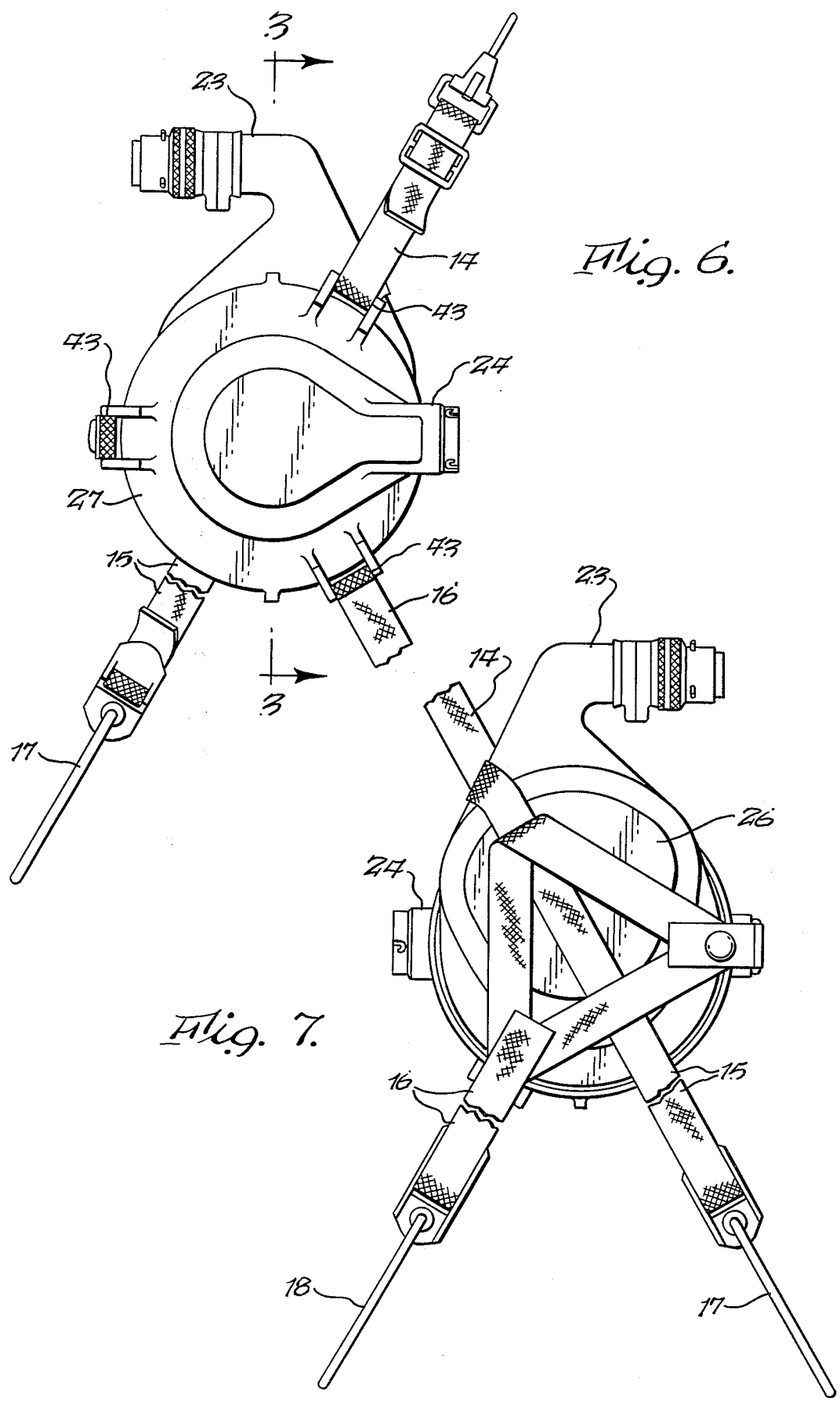

GAS FILTER CONTAINER

BACKGROUND OF THE INVENTION

This invention relates to containers, and more particularly to an improved container within which a gas filter is positioned, the container being especially adapted for use in aircraft applications for filtering air-gas mixtures to render them breatheable.

Several known gas filter containers utilized in aircraft applications are of relatively flat construction adapted to employ filters which are removably positioned within a housing. The housing can comprise a pair of opposed, dish-shaped elements which are circumferentially attached to enclose one or more generally semi-circular filter elements positioned within the container. The containers themselves are usually of rigid, substantially non-yieldable construction and a particular filter container is most often adapted for use with only a single design of filter element.

In high speed aircraft where provisions are made for permitting a pilot or other crew member to forcibly eject himself from the aircraft because of engine failure or another substantial failure which would preclude his safely landing the aircraft, the use of such existing rigid filter containers has been found to be undesirable in that ejection at such high speeds as, for example, 600 miles per hour, imposes a substantial wind load on the crew member and on the items he may have attached to his flight suit. The prior art rigid containers which were positioned on the crew member's chest were found to have imposed significant loads on his chest during ejection because of the non-yieldable nature of the filter containers heretofore used.

In addition to the need to reduce the loads transferred to the body of the crew member, the necessity for utilizing a different container for each particular style of filter requires a rather substantial inventory both of filters and of filter containers.

It is an object of the present invention to overcome the above-described difficulties and problems to provide an improved gas filter container which is adaptable for use with varying types of filter elements and which is so designed and configured as to elastically absorb part of the wind load ordinarily transferred to the wearer's chest during ejection.

SUMMARY OF THE INVENTION

Briefly stated, in accordance with one aspect of the present invention, a gas filter container is provided for receiving and positioning a gas filter utilized for filtering out toxic gases and to render air and gas mixtures passing therethrough breatheable. The container includes means for conveying gas to the filter and means for carrying filtering gas away from the filter. Structurally, the container includes a generally cylindrical housing having an annular, sidewall-defining portion, and a second end wall portion. The second end wall portion includes the gas flow outlet means and means for releasably attaching a filter canister which is adapted to be positioned within the housing. The first end wall portion is formed from an elastomeric, substantially gas impermeable material to permit deflection thereof when axial loads are applied to said container and to resist permeation of gases. Interconnecting the first and second end walls is an annular, sidewall defining portion which provides a cylindrical cavity.

BRIEF DESCRIPTION OF THE DRAWINGS

FIG. 3 is a longitudinal cross-sectional view of the container shown in FIG. 2 with the several parts thereof in their operative relationship.

FIG. 4 is a transverse cross-sectional view of the rear portion of the container through the gas inlet connection and taken along the line 4—4 of FIG. 3.

FIG. 5 is a longitudinal cross-sectional view of the front portion of the container taken through the gas outlet connection.

FIG. 6 is a front view of the container in assembled form and showing the attachment points for the straps utilized to hold the device to the body of the aircraft crew member.

FIG. 7 is a rear view of the assembled device showing the interrelationship of the strapping means.

DESCRIPTION OF THE PREFERRED EMBODIMENTS

Figure 1:
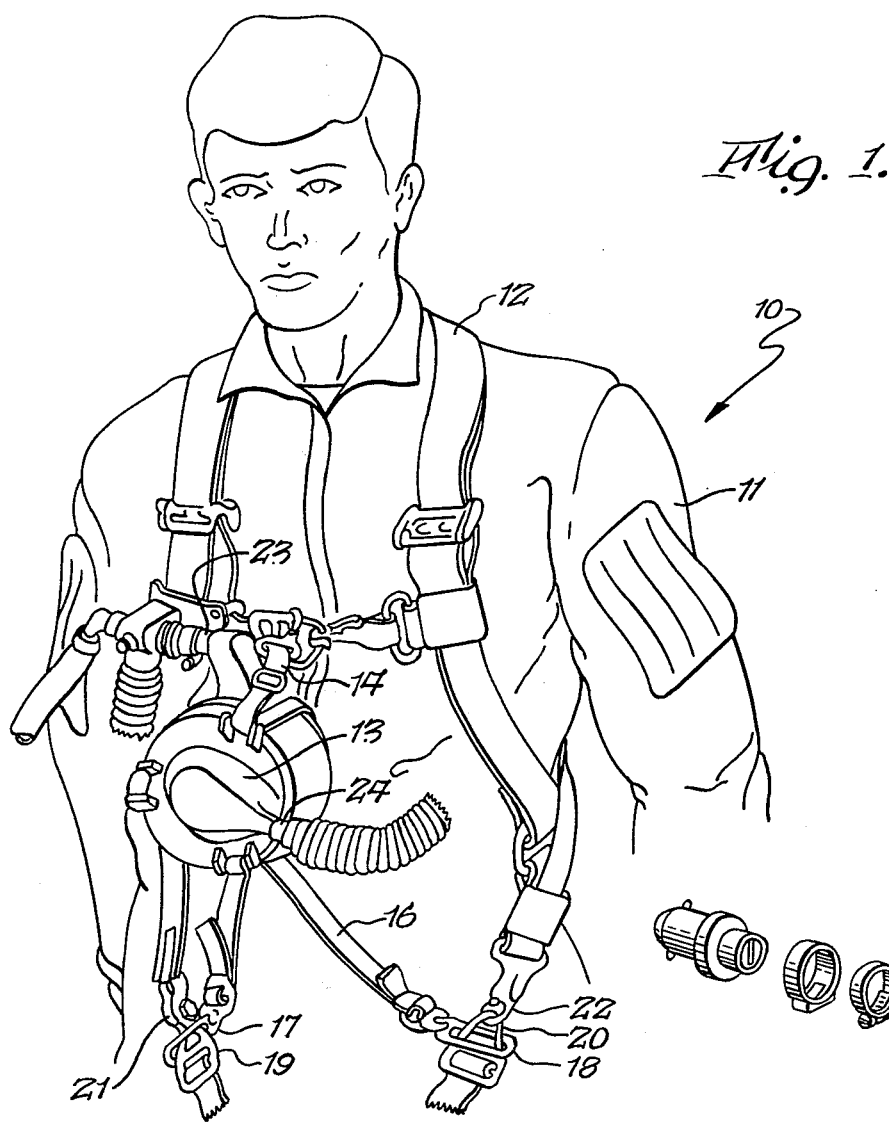
FIG. 1 is a perspective view showing a gas filter container according to the present invention strapped to the body of an aircraft crew member.

Referring now to the drawings and particularly to FIG. 1 thereof, there is shown the upper torso of an aircraft crew member 10 wearing a flight suit 11 and a parachute harness 12. A gas filter container 13 in accordance with the present invention is shown strapped to the body of the aircraft crew member by means of the several straps, 14, 15, and 16, and also includes links 17, 18 for connecting the container in a releasable fashion to parachute harness 12, whereby to permit container 13 to be readily removed upon disconnection of the parachute harness. Links 17, 18 are loosely positioned around loop members 19, 20, respectively, and when clips 21, 22 are released from engagement with loops members 19, 20 to release the parachute harness, links 17, 18 simultaneously slip free, thereby permitting the aircraft crew member to quickly disengage straps 15, 16 from parachute harness 12. As shown, container 13 includes an inlet 23, through which air, oxygen, and sometimes other gases, are admitted to container 13, and an outlet 24 through which the gases pass after they have been filtered. Between the inlet 23 and outlet 24 the air and gas mixture passes through a filter element, as hereinafter described, so that any toxic gases included in the incoming gas mixture are removed therefrom, thereby rendering the outgoing gas mixture safely breatheable.

Figure 2:
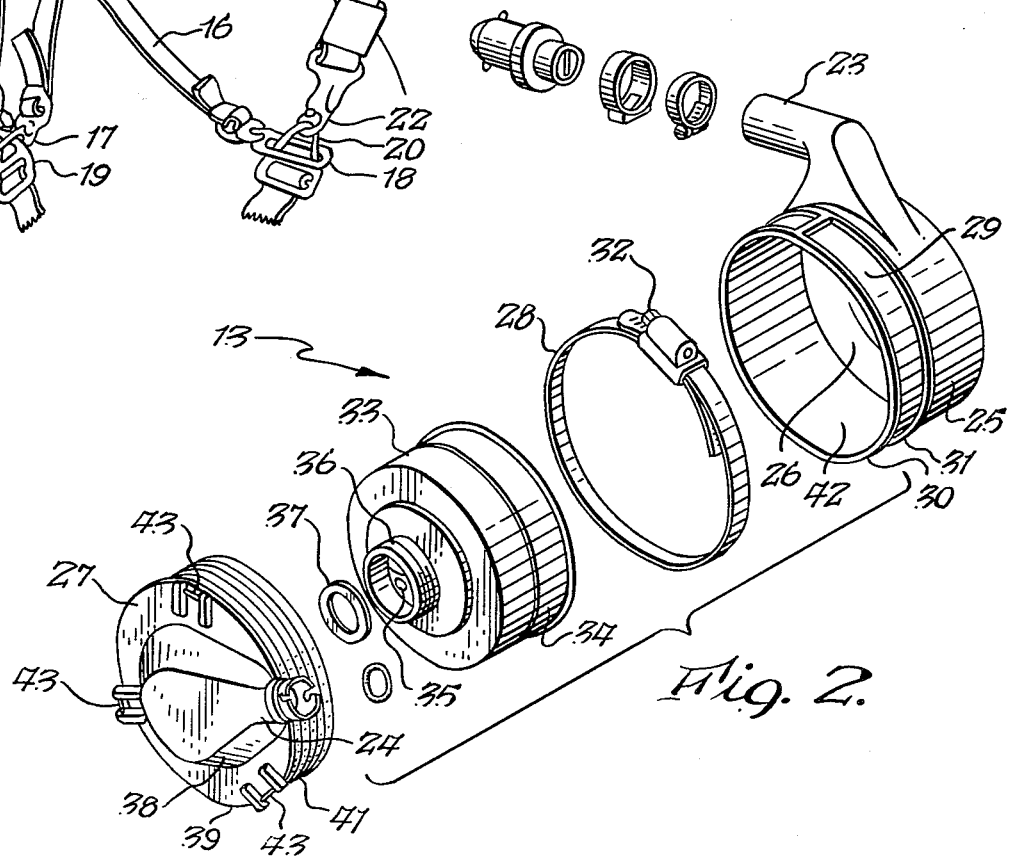
FIG. 2 is an exploded view of the gas filter container of the present invention showing the several parts thereof in spaced relationship and without the surrounding network of straps which secure the container to the aircraft crew member.

Referring now to FIG. 2, container 13 includes a housing having an annular, generally cylindrical sidewall portion 25, and a first end wall portion 26, which serves to close off one end of annular portion 25. A second end wall portion 27 is provided to engage with the open end of annular sidewall portion 25 and to fit within the sidewall portion in substantially gas-tight relationship. An annular clamp 28 is provided to facilitate the sealing of second end wall portion 27 to annular sidewall portion 25. Clamp 28 fits in a circumferential recess 29 defined by axially spaced circumferential ridges 30, 31, and is brought into clamping relationship with recess 29 by tightening clamp screw 32 in a manner well known to those skilled in the art.

The assembly of annular sidewall 25, first end portion 26, and second end wall 27 define a substantially cylindrical cavity within which a filter element 33 can be positioned. Filter element 33 is also of cylindrical construction and includes a body 34 and an outlet 35 encircled by an externally threaded neck 36 which is received in second end wall 27, as will hereinafter be described. A flexible sealing gasket 37 is provided to insure a gas-tight seal between neck 36 of filter 33 and the filter-receiving portion of second end wall 27 in order to insure that any gas which passes through the second end wall portion has first passed through the filter element.

The portion of the cylindrical housing defined by annular sidewall 25 and first end wall 26 is preferably a unitary element of the assembly and can be molded from a substantially gas impermeable, resilient material which is deformable but elastic, to the extent that it regains its original shape when a load applied thereto is removed. Suitable materials for that portion of the container are butyl rubber or polymeric materials having substantial impermeability to the passage of gases and preferably having a substantial sidewall thickness to prevent unintended collapse during use, yet still being yieldable upon the application of loads. The radial and axial size of annular sidewall 25 is preferably such as to be capable of accepting a variety of sizes of filter elements.

Second end wall 27 is preferably made from a rigid material, such as, for example, cast aluminum, which can then be machined to the desired size and configuration. By providing second end wall 27 of a rigid material, clamp 28 utilized to connect and attach second end wall 27 to annular sidewall 25 is more effective in providing sealing in that because of the flexible nature of annular sidewall 25, by virtue of the clamping action the two parts are brought into closely-fitting, gas-tight relationship.

Referring now to FIG. 3, the several parts comprising filter container 13 are shown in their assembled form. As there shown, second end wall 27, which is preferably formed from a rigid material, includes an outwardly-extending, generally dish-shaped wall 38, the outer portion of which terminates in a flange 39 from which an inwardly directed annular wall 40 extends, which wall carries a plurality of axially spaced circumferential ridges 41 on its exterior surface. Ridges 41 are adapted to engage with the inner surface 42 of annular sidewall 25 when clamp 28 is tightened circumferentially so as to provide a gas-tight fit therebetween. Formed as an integral part of flange 39 are several strap loops 43 which are positioned to orient the straps and to permit the assembled device to be secured to the wearer in a predetermined position by means of straps 14, 15, and 16, as will hereinafter be described in further detail.

As best seen in FIG. 5, second end wall 27 includes outlet 24, which permits communication between filter outlet 35 and a suitable face mask (not shown). To insure that only filtered gases are conveyed to the wearer's face mask, metal inner wall 44 is provided, which can also be of generally dished shape as shown, and which is spaced inwardly from metal wall 38 to form a cavity therebetween. Inner wall 44 is disposed in sealing engagement with wall 38, as by means of a ridge and groove arrangement 45, and is secured thereto as by means of welding or by means of a suitable adhesive to provide a gas-tight seal. An internal thread 46 and an aperture 47 are provided in inner wall 44 to permit filter 33 to be secured in place and to permit passage of gases through wall 44, respectively. To provide a seal between threaded neck 36 of filter 33 and internal thread 46 of wall 44, an inwardly extending lip 48 is provided at the outer end of aperture 47 and a groove 49 adjacent thereto to receive and hold flexible sealing gasket 37 which, when compressed by screwing filter 33 into inner wall 44, provides the desired gas-tight seal. Thus it will be seen that all gases that pass through outlet 24 have first passed through filter element 33, and any failures of first end wall 26, due to puncture, rupture, or the like, or any failure of clamp 28, will not affect the filtration process and thus no toxic gases will be inhaled by the wearer.

The internal structure of first end wall 26 is shown most clearly in FIG. 4, which is a view looking at first end wall 26 from within the container and showing, in phantom, canister 33 as it is in position within container 13. As shown, first end wall 26 includes a pair of inwardly-projecting ridges 50, which are also visible in FIG. 3, ridges 50 being positioned near the periphery of filter element 33, and also a large, generally crescent-shaped, inwardly-extending ridge member 51 which is spaced diagonally from ridges 50. Also extending inwardly from first end wall 26 are a plurality of generally hemispherical projections 52. Ridges 50, 51 and hemispherical projections 52 are formed integrally with first end wall 26 and serve to prevent the inlet opening (not shown) in filter inlet 53 of filter element 33 from becoming blocked by the inner surface of first end wall 26 upon inward collapse thereof due to loads imposed thereon, thereby providing continuous communication between inlet 53 of filter element 33 and inlet 23 of container 13. Consequently, since annular sidewall 25 and first wall 26 are formed from a resilient material, when a substantially axial force is applied to second end wall 27, which would tend to collapse first end wall 26 and press it against the inlet opening to filter element 33, ridges 50, 51 and projections 52 serve to maintain a flow path between the inner surface of first end wall 26 and filter inlet 53 by maintaining a space therebetween to maintain communication so that the flow of air-gas mixture through filter element 33 is not impeded. FIG. 3 shows filter 33 in position when container 13 is not under axial load, and shows space between inlet 53 and ridges 50, 51 and hemispherical projections 52 to accommodate filter elements 33 having different axial lengths. Similarly, the inner diameter of annular wall 40 is such as to accommodate filter elements having different diameters.

Referring now to FIGS. 6 and 7, there is illustrated the attachment arrangement which involves the three strap loops 43, which are preferably integrally formed with second end wall 27, and permit securement of the assembled container 13 to the body of an aircraft crew member in the manner illustrated in FIG. 1. The two lowermost straps 15, 16 include elongated loops 19, 20, respectively, which are adapted to be releasably connected when parachute harness 12 is disconnected. The interrelationship of the various straps and their interconnection on the rearmost portion of container 13 is shown in FIG. 7.

It should be noted that the slip connection between filter container straps 15 and 16 and parachute harness 12, which is accomplished by links 17 and 18, is very important. Both links 17 and 18 have elongated openings sufficiently long to permit them to fit over loops 19 and 20, respectively, and to slide in a generally longitudinal direction relative to the parachute harness belt itself from the outer end of loops 19 and 20 up to the point where the harness belt loops thereover. Longitudinal movement beyond the outer ends of loops 19 and 20 is prevented by clips 21 or 22, respectively, which fit over loops 21 and 20 to complete the parachute harness connection and define a disconnection point, the movement being limited because the widths of the longitudinal openings in links 17 and 18 are less than the corresponding arc dimensions of clips 21 and 22. Thus, loops 17 and 18 are capable of limited movement with respect to loops 19 and 20, but also operate to securely position container 13 on the body of the wearer, in conjunction with parachute harness 12. In addition, because loops 17 and 18 will readily separate from parachute harness 12 upon the disconnection of clips 21 and 22, respectively, release of the container is facilitated because fewer manipulations are required by the wearer to extricate himself from the various straps and harnesses in an emergency situation after bailout.

It would be apparent to those skilled in the art that the physical appearance of the container shown in the drawings can be altered while maintaining the benefits of the present invention. For example, the relative positions and orientation of the inlet and outlet could be varied from those shown to suit particular circumstances.

While particular embodiments of the invention have been illustrated and described, it will be apparent to those skilled in the art that various changes and modifications can be made without departing from the spirit and scope of the present invention, and it is intended to cover in the appended claims all such changes and modifications that come within the scope of the present invention.

What is claimed is:

1. A gas filter container having assembled therein a gas filter canister of the type having a canister gas inlet and a canister gas outlet, the container and canister being capable of filtering toxic gases from an incoming gas mixture to render it breatheable upon exiting therefrom; said container comprising:
    (a) a housing having a generally cylindrical sidewall-defining portion and a first end wall portion, said first end wall portion formed from an elastic, substantially gas impermeable material; said housing being provided with container inlet means capable of permitting the gas to be filtered to enter said container;
    (b) a second end wall portion having an annular wall extending therefrom and engaging said sidewall-defining portion when said second end wall portion is secured to said housing to define therewith a substantially gas tight cylindrical enclosure, said second end wall portion being provided with container outlet means capable of permitting gas to exit from said container and securing means for releasably securing the gas filter canister in substantially gas-tight relationship to said second end wall portion, said second end wall portion providing communication between the canister gas outlet of said gas filter canister and said container outlet means; and
    (c) means for releasably securing said second end wall portion to said housing in substantially gas-tight relationship therewith in such a manner that said generally cylindrical sidewall-defining portion, said first end wall portion, and said second end wall portion define said substantially gas-tight enclosure for said gas filter canister and provide a continuous gas flow path from the container inlet means to the container outlet means wherein all gas passing through said container also passes through the gas filter canister.

2. The gas filter container of claim 1 wherein said second end wall portion includes a plurality of axially spaced, external, circumferential ridges on said annular wall.

3. The gas filter container of claim 1 wherein said generally cylindrical, sidewall-defining portion and said first end wall portion are unitary.

4. The gas filter container of claim 1 wherein said housing is elastically collapsible under substantially axial loading of said gas filter container.

5. The gas filter container of claim 4 wherein said housing includes means to limit the extent of collapse thereof, said limiting means being so positioned and configured as to preclude complete cessation of gas flow through said gas filter container.

6. The gas filter container of claim 5 wherein said limiting means comprises at least one inwardly-directed projection on the inner surface of said first end wall portion, said inwardly-directed projection extending toward said second end wall portion and having an axial extent sufficient to permit a predetermined minimum gas flow through said container while said housing is in a collapsed condition.

7. The gas filter container of claim 1 wherein said second end wall portion includes securing means to releasably secure said container to the body of a user.

8. The gas filter container of claim 7 wherein said securing means includes means to releasably interconnect said gas filter container to a parachute harness.

9. The gas filter container of claim 8 wherein said interconnection means includes at least one elongated loop slidably positioned at a disconnection point on said parachute harness so that said interconnection of said container to said parachute harness is released when said parachute harness is disconnected at said disconnection point.

* * * * *